United States Patent
Köhnlein et al.

(10) Patent No.: US 11,255,254 B2
(45) Date of Patent: *Feb. 22, 2022

(54) COMPRESSOR ARRANGEMENT FOR AN INTERNAL COMBUSTION ENGINE AND METHOD FOR OPERATING A COMPRESSOR ARRANGEMENT

(71) Applicant: AUDI AG, Ingolstadt (DE)

(72) Inventors: Maximilian Köhnlein, Wettstetten (DE); Robert Solbeck, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/962,020

(22) PCT Filed: Jan. 28, 2019

(86) PCT No.: PCT/EP2019/052000
§ 371 (c)(1),
(2) Date: Jul. 14, 2020

(87) PCT Pub. No.: WO2019/162045
PCT Pub. Date: Aug. 29, 2019

(65) Prior Publication Data
US 2020/0347777 A1      Nov. 5, 2020

(30) Foreign Application Priority Data

Feb. 26, 2018   (DE) .................... 10 2018 202 851.6

(51) Int. Cl.
*F02B 37/16* (2006.01)
*F02B 39/16* (2006.01)
(Continued)

(52) U.S. Cl.
CPC ......... *F02B 37/164* (2013.01); *F01M 13/021* (2013.01); *F02B 39/16* (2013.01);
(Continued)

(58) Field of Classification Search
CPC ..... F02B 37/164; F02B 39/16; F01M 13/021; F01M 2013/027; F02M 35/086;
(Continued)

(56) References Cited

U.S. PATENT DOCUMENTS 4,817,387 A *  4/1989  Lashbrook .............. F02B 37/16
                                                     60/611
8,683,800 B2 *  4/2014  Cunningham ......... F02M 35/10
                                                     60/611
(Continued)

FOREIGN PATENT DOCUMENTS

CN       204239101 U     4/2015
DE     102008060026 A1   6/2010
(Continued)

OTHER PUBLICATIONS

An English Machine Translation to Friedrch (Pub. No. DE 10 2017 201 784 A1), published on Oct. 19, 2017.*
(Continued)

*Primary Examiner* — Thai Ba Trieu
(74) *Attorney, Agent, or Firm* — Maier & Maier, PLLC

(57) ABSTRACT

A compressor arrangement for an internal combustion engine, having a compressor which is arranged in a compressor housing and has a low pressure side and a high pressure side, and having a negative pressure provision unit, which has a propellant channel that is fluidically connected, on the one hand, via a propellant inlet fitting to the high pressure side of the compressor and, on the other hand, via a propellant outlet fitting to the low pressure side of the compressor and has a nozzle, and which has a negative
(Continued)

pressure channel opening into the propellant channel fluidically between the propellant inlet fitting and the propellant outlet fitting.

15 Claims, 3 Drawing Sheets

(51) Int. Cl.
*F01M 13/02* (2006.01)
*F02M 35/08* (2006.01)
*F02M 35/10* (2006.01)
*F04F 5/20* (2006.01)

(52) U.S. Cl.
CPC .... *F02M 35/086* (2013.01); *F02M 35/10157* (2013.01); *F02M 35/10222* (2013.01); *F02M 35/10229* (2013.01); *F04F 5/20* (2013.01); *F01M 2013/027* (2013.01); *F05D 2220/40* (2013.01); *F05D 2260/601* (2013.01)

(58) Field of Classification Search
CPC ....... F02M 35/10157; F02M 35/10222; F02M 35/10229; F04F 5/20; F05D 2220/40; F05D 2220/601; F05D 2260/601
USPC .................. 60/605.1, 611; 415/58.4, 208.1
See application file for complete search history.

(56) References Cited

U.S. PATENT DOCUMENTS

| | | | |
|---|---|---|---|
| 9,010,115 B2* | 4/2015 | Pursifull | F02B 37/164 |
| | | | 60/611 |
| 9,010,116 B2* | 4/2015 | Cunningham | F02M 35/10 |
| | | | 60/611 |
| 9,086,036 B2 | 7/2015 | Inoguchi et al. | |
| 9,322,289 B2* | 4/2016 | Pursifull | F02B 37/164 |
| 2008/0267765 A1 | 10/2008 | Chen | |
| 2012/0039702 A1 | 2/2012 | Sharp | |
| 2012/0199104 A1 | 8/2012 | Vogl | |
| 2012/0328424 A1 | 12/2012 | Berger et al. | |
| 2016/0040688 A1* | 2/2016 | Fletcher | F02B 37/164 |
| | | | 123/184.53 |
| 2016/0201613 A1* | 7/2016 | Ulrey | F02B 37/164 |
| | | | 123/520 |
| 2016/0305377 A1 | 10/2016 | Stefaniak et al. | |
| 2016/0341155 A1* | 11/2016 | Dudar | F02B 37/164 |
| 2016/0377038 A1 | 12/2016 | Bittner | |
| 2017/0009679 A1* | 1/2017 | Pursifull | F02B 37/164 |
| 2017/0314512 A1* | 11/2017 | Dudar | F02D 41/0032 |
| 2017/0362994 A1 | 12/2017 | Onishi et al. | |
| 2018/0334974 A1* | 11/2018 | Pursifull | F02B 37/164 |
| 2021/0017899 A1* | 1/2021 | Kohnlein | F02B 37/164 |

FOREIGN PATENT DOCUMENTS

| | | |
|---|---|---|
| DE | 102011104424 A1 | 12/2012 |
| DE | 202014105108 U1 | 11/2014 |
| DE | 102014223765 A1 | 6/2015 |
| DE | 102015200053 A1 | 7/2015 |
| DE | 102017204785 A1 | 10/2017 |
| JP | 2015187438 A | 10/2015 |
| JP | 2018-501427 A | 1/2018 |

OTHER PUBLICATIONS

An English Machine Translation to Weinert et al. (Pub. No. DE 10 2011 104 424 A1), published on Dec. 20, 2012.*
German Examination Report dated Oct. 24, 2018 in corresponding German Application No. 10 2018 202 851.6; 14 pages; Machine translation attached.
International Search Report (with English translation) and Written Opinion (with Machine translation) dated Mar. 21, 2019 in corresponding International Application No. PCT/EP2019/052000; 20 pages.
English-language translation of the International Preliminary Report on Patentability and Written Opinion dated on Aug. 27, 2020 in corresponding International Application No. PCT/EP2019/052000; 7 pages.
Chinese Office Action dated Sep. 1, 2021, in connection with corresponding CN Application No. 201980015293.1 (19 pp., including machine-generated English translation).

* cited by examiner

COMPRESSOR ARRANGEMENT FOR AN INTERNAL COMBUSTION ENGINE AND METHOD FOR OPERATING A COMPRESSOR ARRANGEMENT

FIELD

The disclosure relates to a compressor arrangement for an internal combustion engine, having a compressor which is arranged in a compressor housing and has a low pressure side and a high pressure side, and having a negative pressure provision unit, which has a propellant channel that is fluidically connected, on the one hand, via a propellant inlet fitting to the high pressure side of the compressor and, on the other hand, via a propellant outlet fitting to the low pressure side of the compressor and has a nozzle, and which has a negative pressure channel opening into the propellant channel fluidically between the propellant inlet fitting and the propellant outlet fitting, wherein the propellant channel is formed in a housing separate from the compressor housing, on which the propellant inlet fitting and/or the propellant outlet fitting is/are formed as plug fittings. The disclsoure furthermore relates to a method for operating a compressor arrangement.

BACKGROUND

For example, the document DE 20 2014 105 108 U1 is known from the prior art. This describes an engine system comprising the following: a first and a second suction device, each comprising a suction tap in a constriction of the suction device, a suction tap in an expansion cone of the suction device, and a suction tap in a straight pipe, downstream from the expansion cone, wherein the first suction device comprises a drive inlet connected to an engine intake and a mixture flow outlet connected to the intake downstream from a main throttle, and wherein the second suction device comprises a mixture flow outlet connected to the intake downstream from the drive inlet of the first suction device and a drive inlet connected to the intake downstream from the main throttle.

The document JP 2015-187438 A describes a device for discharging fuel vapor from a fuel tank. In this case, a discharge device is integrated into an inlet fitting of a compressor, wherein the discharge device removes a part of the charge air downstream from the compressor via a flow connection and the fuel vapor is supplied to the compressor from the fuel tank.

Furthermore, the document U.S. Pat. No. 9,086,036 B2 is known from the prior art.

SUMMARY

It is an object of the invention to propose a compressor arrangement for an internal combustion engine which has advantages over known compressor arrangements, in particular has a simple and cost-effective option for providing negative pressure and moreover can be diagnosed reliably.

This is achieved according to the invention by a compressor arrangement for an internal combustion engine having the features of claim 1. It is provided here that the propellant inlet fitting can be brought into a fluidic connection with a first fitting and the propellant outlet fitting can be brought into a fluidic connection with a second fitting, wherein the first fitting and the second fitting are formed on the compressor housing or on a flow guiding element connected to the compressor housing.

It is fundamentally provided that the propellant channel is formed in a housing separate from the compressor housing, on which the propellant inlet fitting and/or the propellant outlet fitting is/are formed as plug fittings.

The compressor arrangement can be associated with the internal combustion engine and can thus be part of the internal combustion engine. It is preferably used to provide compressed fresh gas for the internal combustion engine. For this purpose, the compressor arrangement has the compressor, to which fresh gas is provided at a first pressure on the low pressure side. The compressor compresses the provided fresh gas and in turn provides it on the high pressure side for the internal combustion engine, namely at a second pressure which is higher than the first pressure. The fresh gas can be provided in the form of fresh air, but also as a fresh air-exhaust gas mixture. In the latter case, the internal combustion engine is equipped with an external exhaust gas recirculation system, for example. The compressor or the compressor arrangement can be part of an exhaust gas turbocharger, for example, which is associated with the internal combustion engine.

In addition to the compressor, the compressor arrangement has the negative pressure provision unit, by means of which negative pressure can be provided or is provided for a negative pressure consumer. The negative pressure consumer is provided, for example, in the form of a flushing unit for a filter, in particular for an activated carbon filter, and/or as a venting unit, in particular as a crankcase venting unit.

The negative pressure provision unit has the propellant channel, via which a propellant can be guided to provide negative pressure. The fresh gas compressed by means of the compressor is used as the propellant for providing negative pressure.

For this purpose, the propellant channel is fluidically connected, on the one hand, to the high pressure side of the compressor and, on the other hand, to the low pressure side of the compressor. The negative pressure provision unit has the propellant inlet fitting for the connection of the propellant channel to the high pressure side and has the propellant outlet fitting for the connection to the low pressure side.

The negative pressure provision unit, in particular the propellant channel, represents a bypass for the compressor, via which already compressed fresh gas can be guided or is guided from the high pressure side back to the low pressure side. To provide the negative pressure, the negative pressure channel opens into the propellant channel. In the negative pressure channel or at a negative pressure fitting of the negative pressure provision unit, which is provided on the side of the negative pressure channel facing away from the propellant channel, the negative pressure is provided when propellant or fresh gas flows through the propellant channel.

To provide the negative pressure, the nozzle is arranged in the propellant channel. The propellant inlet fitting is fluidically connected to the propellant outlet fitting via the nozzle. The negative pressure channel opens, for example, into the nozzle or downstream of the nozzle, in particular directly downstream of the nozzle, into the propellant channel. In the first case, the nozzle is provided in the form of a Venturi nozzle, in which the Venturi effect is utilized to provide the negative pressure in the negative pressure channel and thus at the negative pressure fitting due to the propellant flowing through the propellant channel.

In the case of the Venturi nozzle, the nozzle represents a cross-sectional constriction into which the propellant channel opens. A continuous cross-sectional constriction is particularly preferably formed down to a smallest flow cross section, which is adjoined by a continuous enlargement of the flow cross section, i.e., a reduction of the cross-sectional constriction. The propellant channel preferably opens into the nozzle in the region of the smallest flow cross section, but at least in the region of the cross-sectional constriction.

If the propellant channel opens into the propellant channel downstream of the nozzle, the nozzle is thus provided as a jet nozzle of a jet pump. In the case of the jet pump, the jet nozzle opens into a mixing chamber, which has a larger flow cross section than an exit opening of the nozzle, via which the nozzle is connected to the mixing chamber. There is thus a sudden widening of the flow cross section in the case of the jet nozzle. The negative pressure channel also opens into the mixing chamber, so that as propellant flows through the propellant channel, the fluid present in the negative pressure channel is entrained by the propellant in the direction of the propellant outlet fitting, in particular by introducing momentum.

The propellant channel and thus the nozzle are arranged in the housing, which is provided or formed separately from the compressor housing. The housing, which is part of the negative pressure provision unit, is installable on the compressor housing. Before operation of the compressor arrangement—if the provision of negative pressure is desired—the housing of the negative pressure provision unit is thus to be arranged such that the propellant channel is fluidically connected, on the one hand, to the high pressure side and, on the other hand, to the low pressure side of the compressor.

The formation of the propellant channel in the separate housing, which can be formed in one part or in multiple parts, has the advantage that easy replaceability of the negative pressure provision unit is provided. In addition, the negative pressure provision unit can be installed particularly efficiently, in particular if the negative pressure provision unit is formed completely in the housing. In this case, in addition to the propellant channel, the nozzle and the negative pressure channel are formed in the housing.

Preferably, at least one region of the propellant channel, in which the nozzle is arranged, and the negative pressure channel are arranged in a part of the housing embodied integrally and/or made of the same material. Both the region of the propellant channel and also the nozzle and the negative pressure channel are represented here by a recess of the housing. The housing part can particularly preferably be provided as an injection molded part, so that the region of the propellant channel, the nozzle, and the negative pressure channel will be formed or are formed during a shared injection molding procedure.

Both the propellant inlet fitting and the propellant outlet fitting are formed on the housing. At least one of the two fittings, i.e., either the propellant inlet fitting or the propellant outlet fitting, is formed as a plug fitting, by means of which a flow connection can be established by plugging in. In this regard, it can be provided that the propellant inlet fitting or the propellant outlet fitting is designed as or has a plug connection projection.

Alternatively, of course, it can be provided that the propellant inlet fitting or the propellant outlet fitting has a plug connection receptacle for accommodating such a plug connection projection. Of course, it can be provided that both the propellant inlet fitting and also the propellant outlet fitting are each provided as a plug fitting. However, particularly preferably only one of the fittings, particularly preferably the propellant outlet fitting, is formed as such a plug fitting. The plug fitting enables a flow connection to be established with a high level of leak-tightness, which is moreover extremely tolerant to displacements, in particular of the negative pressure provision unit with respect to the compressor housing.

The described design of the compressor arrangement, in particular the negative pressure provision unit and the housing, enables simple installation with outstanding leak-tightness at the same time. To establish the flow connection of the fitting formed as a plug fitting, it is only necessary to plug two elements one into another. Moreover, the compressor arrangement enables a good ability to diagnose, because the functionality, in particular the leak-tightness, of the negative pressure provision unit can be diagnosed with the aid of a pressure sensor, which measures the pressure in the compressor arrangement, for example, in the negative pressure channel, at the negative pressure fitting or on the high pressure side of the compressor. A pressure sensor is typically provided in any case to determine the pressure of the fresh gas, which can then also be referred to as charge air.

Additionally or alternatively, the negative pressure provision unit can have a further pressure sensor, by means of which the pressure is ascertained in the negative pressure channel. In this regard, only the pressure sensor, which is typically provided in any case, of the compressor and/or the further pressure sensor associated with the negative pressure channel are necessary for the complete diagnosis and/or leak-tightness check of the negative pressure provision unit. A high level of operational reliability is thus moreover achieved with the aid of the described compressor arrangement.

The invention provides that the propellant inlet fitting can be brought into a fluidic connection with a first fitting and the propellant outlet fitting can be brought into a fluidic connection with a second fitting, wherein the first fitting and the second fitting are formed on the compressor housing or on a flow guiding element connected to the compressor housing. Propellant can thus be supplied via the first fitting to the negative pressure provision unit or the propellant channel and can be removed via the second fitting. In other words, the propellant channel is fluidically connected or at least connectable via the first fitting to the high pressure side of the compressor and via the second fitting to the low pressure side of the compressor.

The two fittings, i.e., the first fitting and the second fitting, can each be provided on the compressor housing. Alternatively, they are formed on the flow guiding element. In the case of the formation of the fittings on the compressor housing, the negative pressure provision unit or its housing is arranged directly on the compressor housing, namely in such a way that the propellant inlet fitting is fluidically connected to the first fitting and the propellant outlet fitting is fluidically connected to the second fitting.

If the fittings are provided on the flow guiding element, the flow guiding element is thus fluidically connected to the compressor, namely in such a way that the first fitting subsequently has a flow connection to the high pressure side and the second fitting has a flow connection to the low pressure side of the compressor. The flow guiding element can additionally have a fresh gas inlet channel, via which fresh gas can be supplied to the compressor. For this purpose, the first gas inlet duct is connected, on the one hand, to the low pressure side of the compressor and, on the other hand, to an external environment of the internal combustion engine, in particular via a filter or air filter.

The flow guiding element is formed or produced separately from the compressor housing and is arranged and fastened thereon after its production. The flow guiding element can be made of the same material as the compressor housing and can thus consist of the same material. However, the flow guiding element is particularly preferably made of a material which is different from a material of the compressor housing. For example, the flow guiding element consists of a plastic, while in contrast the compressor housing consists of metal. The cost-effective production, the simple installation, and the outstanding ability to diagnose are achieved both if the negative pressure provision unit is arranged on the compressor housing and also if it is arranged on the flow guiding element.

A further preferred embodiment of the invention provides that the propellant outlet fitting has a plug connection projection and the second fitting has a plug connection receptacle for accommodating the plug connection projection. In other words, the plug connection projection is provided on the housing of the negative pressure provision unit, in particular it is made of the same material and/or is integrally embodied with it. This means that the plug connection projection is preferably formed jointly with the propellant channel, the nozzle, and the negative pressure channel during the above-mentioned injection molding procedure.

The second fitting, in contrast, has the plug connection receptacle, which is designed in such a way that after the intended arrangement of the plug connection projection in the plug connection receptacle, the flow connection is established between the propellant outlet fitting and the second fitting and thus between the propellant channel and the low pressure side of the compressor. Such a design enables particularly simple installation.

One refinement of the invention provides that the propellant inlet fitting and the first fitting each have a passage opening extending through a contact surface, so that a flow connection can be established between the propellant inlet fitting and the first fitting by laying the contact surfaces flat against one another. The passage opening of the propellant inlet fitting thus extends through a contact surface formed on the housing of the negative pressure provision unit, and the passage opening of the first fitting extends through a contact surface formed on the compressor housing or the flow guiding element. The contact surfaces are preferably each completely flat. The passage openings are particularly preferably each formed peripherally closed in the corresponding contact surface, and thus have a continuous edge in the circumferential direction.

The flow connection between the propellant inlet fitting and the first fitting is to be able to be established by laying the contact surfaces flat against one another. For this purpose, the contact surfaces are preferably pressed tightly against one another and/or sealed in relation to one another by means of a seal. The flow connection formed by laying the contact surfaces flat against one another has a comparatively low tolerance to displacements, in particular in comparison to the flow connection established by means of the plug fitting. If the housing is loosened with respect to the compressor housing, in particular inadvertently loosened, a leak thus first occurs on the part of the propellant inlet fitting. The flow connection provided on the part of the propellant outlet fitting can only become leaky upon a further displacement.

With the aid of the above-described pressure sensor and/or the further pressure sensor, however, the interruption of the flow connection between the propellant inlet fitting and the first fitting can already be diagnosed, so that an error can be recognized and displayed in a timely manner. In this manner, the fluid suctioned in via the propellant channel by the negative pressure provision unit can be prevented from escaping from the compressor arrangement. Rather, it is still reliably supplied via the propellant outlet fitting to the compressor even if the flow connection between the propellant inlet fitting and the first fitting is already interrupted or leaky. The above-mentioned outstanding ability to diagnose the negative pressure provision unit is thus implemented.

One preferred further design of the invention provides that the propellant inlet fitting has an axial ring seal interacting with the first fitting and the propellant outlet fitting has a radial ring seal interacting with the second fitting. The axial ring seal completely encloses the propellant inlet fitting and, after the installation, also the first fitting in the circumferential direction. This applies accordingly to the radial ring seal and the propellant outlet fitting and also the second fitting. The axial ring seal is to be understood as a ring seal in which the sealing effect is achieved by axial elastic compression. The radial ring seal is correspondingly a ring seal in which the sealing effect is caused by elastic radial compression.

It is preferably provided that the axial ring seal presses against the contact surfaces of the propellant inlet fitting and the first fitting or at least one of these contact surfaces to form a seal to implement the sealing effect. For example, the axial ring seal is arranged in a seal receptacle, which extends through one of the contact surfaces, and presses against the respective other contact surface to form a seal after the installation. Of course, such seal receptacles can also be provided in both contact surfaces, as long as it is ensured that the propellant inlet fitting and the first fitting are connected leak-tight to one another after the installation.

The radial ring seal is preferably designed such that it is provided on the plug connection projection and encloses it in the circumferential direction. The radial ring seal is introduced together with the plug connection projection into the plug connection receptacle and subsequently abuts a wall delimiting the plug connection receptacle in the radial direction to form a seal, in particular continuously in the circumferential direction. For example, a seal receptacle is formed in the plug connection projection, in which the radial ring seal is arranged to implement reliable fastening of the radial ring seal and thus to prevent the radial ring seal from being lost.

Such a choice of the seals, i.e., providing the axial ring seal on the propellant inlet fitting and providing the radial ring seal on the propellant outlet fitting, ensures the above-described reliable ability to diagnose in that the flow connection of the propellant outlet fitting to the second fitting is substantially more tolerant to displacements due to the radial ring seal than the flow connection between the propellant inlet fitting and the first fitting via the axial ring seal.

If the negative pressure provision unit, in particular the housing, is displaced with respect to the compressor housing and/or the flow guiding element starting from a first position, in which both flow connections are leak-tight, in the direction of a second position, in which both flow connections are interrupted or leaky, the flow connection between the propellant inlet fitting and the first fitting thus becomes leaky first and the flow connection between the propellant outlet fitting and the second fitting only becomes leaky later.

A further preferred embodiment of the invention provides that the propellant channel has a deflection inside the housing, so that the propellant inlet fitting and the propellant outlet fitting are arranged on the same side of the housing. Such a design ensures, on the one hand, a compact structural form of the negative pressure provision unit and thus of the compressor arrangement. On the other hand, an extremely simple and rapid installation is possible because the installation of the negative pressure provision unit or its housing takes place in a single installation direction.

To establish the flow connection between the fittings of the housing and the fittings of the compressor housing or the flow guiding element, respectively, solely the displacement in the installation direction is thus necessary. During the displacement, firstly the plug connection projection will engage in the plug connection receptacle and subsequently the contact surfaces of the propellant inlet fitting and the first fitting will come into applied contact to form a seal.

A further preferred design of the invention provides that the propellant inlet fitting and the propellant outlet fitting are formed offset in parallel to one another on the housing. This is to be understood to mean that an imaginary plane defining the propellant inlet fitting and an imaginary plane defining the propellant outlet fitting are in parallel, but are arranged spaced apart from one another. In the case of the propellant inlet fitting, for example, the imaginary plane coincides with the contact surface through which the passage opening extends. In the case of the propellant outlet fitting, the plane preferably continuously accommodates the edge of the plug connection projection on its side facing farthest away from the propellant channel. Both planes are preferably perpendicular to the longitudinal center axis of the propellant channel at the propellant inlet fitting and/or a longitudinal center axis of the propellant channel at the propellant outlet fitting.

The offset formation of propellant inlet fitting and propellant outlet fitting is preferably implemented by means of the plug connection projection. In other words, the plug connection projection begins in the plane defining the propellant inlet fitting and extends up to the plane defining the propellant outlet fitting. Outstanding leak-tightness of the flow connection between the fittings of the negative pressure provision unit and the fittings of the compressor housing or of the flow guiding element, respectively, is achieved in this way.

A further embodiment of the invention provides that the deflection is formed by means of a cover of the housing which delimits the propellant channel in some areas. The housing is thus formed in multiple pieces and has a base element and the cover. For example, a part of the propellant channel, in particular a large part of the propellant channel is arranged in the base element. In addition, preferably the negative pressure channel is arranged in at least some areas in the base element and the nozzle is arranged in the base element. The cover is detachably or non-detachably connected to the base element. The detachable connection takes place, for example, in a form-fitting manner, in particular by a catch connection. The non-detachable connection can be implemented, for example, by welding. The use of the cover enatiles a simple and cost-effective embodiment of the housing, for example, by injection molding, wherein the base element and the cover are produced separately from one another.

Finally, it can be provided within the scope of a further design of the invention that the housing is fastenable by means of at least one screw, wherein a longitudinal center axis of a receptacle opening of the housing for accommodating the screw is arranged in parallel to a longitudinal center axis of the propellant channel at the propellant inlet fitting and/or a longitudinal center axis of the propellant channel at the propellant outlet fitting. The screw is used to fasten the housing, for example, on the compressor housing or on the flow guiding element. To accommodate the screw, the housing has the receptacle opening, which is dimensioned such that a shaft of the screw can be guided through it, while in contrast a head of the screw abuts an edge delimiting the receptacle opening or the edge represents an end stop for the head.

The receptacle opening is preferably completely straight in the direction of its longitudinal center axis. The longitudinal center axis of the receptacle opening extends in parallel to the longitudinal center axis of the propellant channel on the side of the propellant inlet fitting and/or on the side of the propellant outlet fitting. As a result, an installation force which can be effectuated by means of the screw between the housing and the compressor housing or the flow guiding element, respectively, acts in a direction which is oriented opposite to a removal of the fittings of the housing from the fittings of the compressor housing or the flow guiding element, respectively.

In other words, the housing is fastened on the compressor housing or the flow guiding element, respectively, by means of the screw in such a way that the contact surfaces of the propellant inlet fitting and the first fitting are pressed against one another. For this purpose, the longitudinal center axis of the receptacle opening for the screw is particularly preferably perpendicular to both contact surfaces. Such a design thus ensures outstanding leak-tightness of the compressor arrangement.

The invention furthermore relates to a method for operating a compressor arrangement for an internal combustion engine, in particular a compressor arrangement according to the statements in the scope of this description, wherein the compressor arrangement has a compressor which is arranged in a compressor housing and has a low pressure side and a high pressure side and a negative pressure provision unit, which has a propellant channel that is fluidically connected, on the one hand, via a propellant inlet fitting to the high pressure side of the compressor and, on the other hand, via a propellant outlet fitting to the low pressure side of the compressor and has a nozzle, and which has a negative pressure channel opening into the propellant channel fluidically between the propellant inlet fitting and the propellant outlet fitting.

It is provided here that the propellant channel is formed in a housing separate from the compressor housing, on which the propellant inlet fitting and/or the propellant outlet fitting is/are formed as plug fittings.

Furthermore, it is provided that the propellant inlet fitting can be brought into a fluidic connection with a first fitting and the propellant outlet fitting can be brought into a fluidic connection with a second fitting, wherein the first fitting and the second fitting are formed on the compressor housing or on a flow guiding element connected to the compressor housing, and wherein a pressure is measured in the negative pressure channel or on the high pressure side of the compressor by means of a pressure sensor and if the pressure falls below or exceeds a limiting value, a leak is detected.

The advantages of such a procedure or of such a design of the compressor arrangement have already been indicated. Both the compressor arrangement and the method for operating it can be refined according to the statements in the context of this description, so that reference is thus made thereto.

The pressure sensor (Not Shown) is used, for example, to measure the pressure in the negative pressure channel, at the negative pressure fitting, or on the high pressure side of the compressor. If the measured pressure deviates from the limiting value or falls below or exceeds it, it can be assumed that the leak or another malfunction is present.

BRIEF DESCRIPTION OF THE DRAWINGS

The disclosure is explained in more detail hereinafter on the basis of the exemplary embodiments shown in the drawing, without the invention being restricted. In the figures.

DETAILED DESCRIPTION

Figure 1:
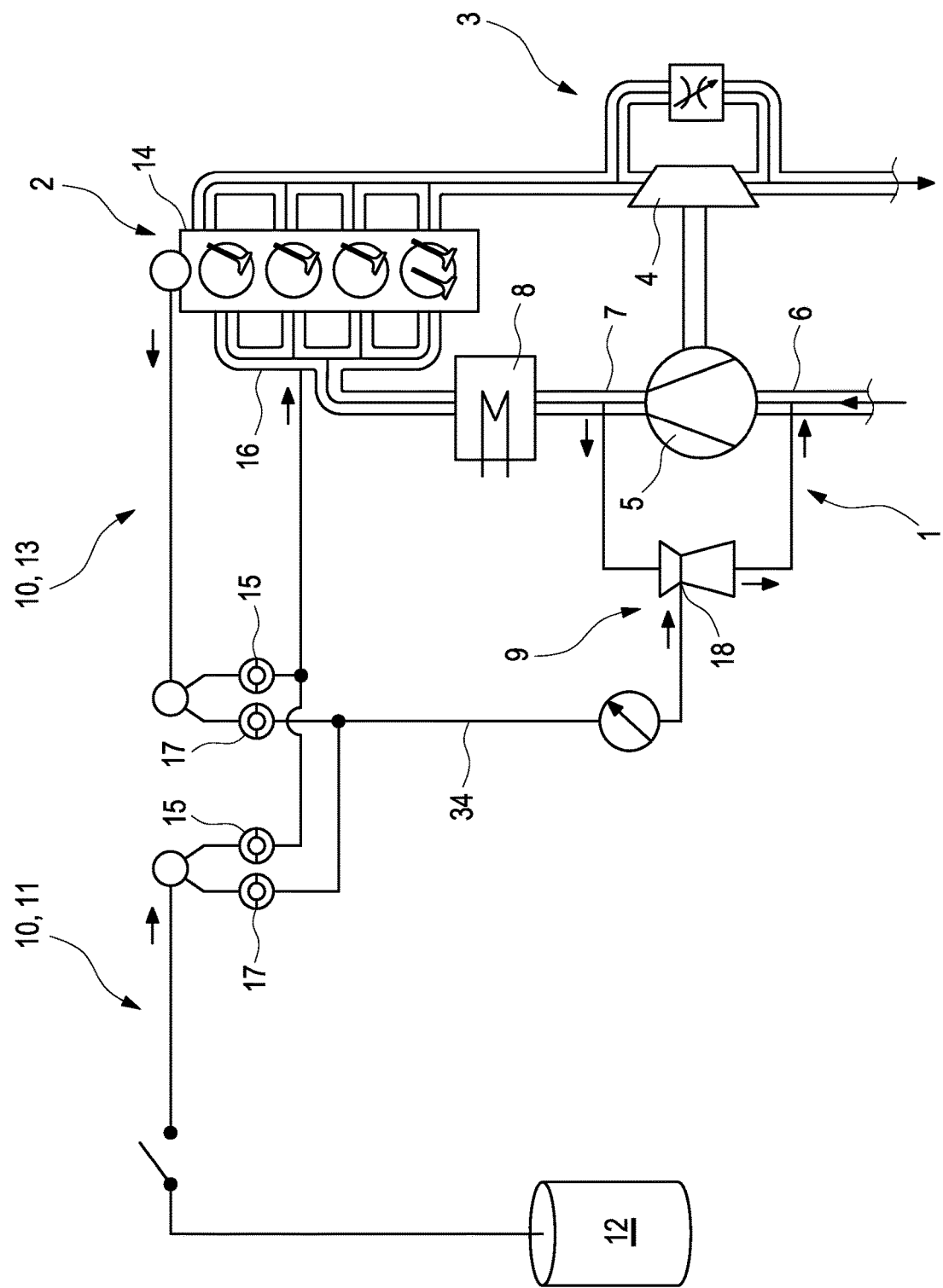
FIG. 1 shows a schematic illustration of a compressor arrangement for an internal combustion engine, which has a negative pressure provision unit for providing a negative pressure for at least one negative pressure consumer.

FIG. 1 shows a schematic illustration of a compressor arrangement 1 for an internal combustion engine 2. The compressor arrangement 1 is part of an exhaust gas turbocharger 3, which has a turbine 4 and a compressor 5, wherein the latter is part of the compressor arrangement 1. Exhaust gas from the internal combustion engine 2 can be supplied to the turbine 4. With the help of the turbine 4, flow energy contained in the exhaust gas and/or enthalpy is converted into kinetic energy, which is in turn used to drive the compressor 5. The compressor 5 is used to compress fresh gas, wherein the fresh gas is provided to the compressor 5 on a low pressure side 6. The fresh gas compressed by means of the compressor 5 is available on its high pressure side 7 to the internal combustion engine 2. A charge air cooler 8 can be provided fluidically between the high pressure side 7 of the compressor 5 and the internal combustion engine 2.

A negative pressure provision unit 9 is provided fluidically in parallel to the compressor 5, which is used to provide negative pressure for at least one negative pressure consumer 10, in the exemplary embodiment illustrated here for two negative pressure consumers 10. One of the negative pressure consumers 10 is provided as a flushing unit 11 for a filter 12, wherein the filter 12 is preferably designed as an activated carbon filter. Another of the partial vacuum consumers 10 is designed as a venting unit 13, which is used for venting a crankcase housing 14 of the internal combustion engine 2.

The negative pressure consumer 10 is or the negative pressure consumers 10 are each connected via check valves 15 to an intake pipe 16 of the internal combustion engine 2 or to an intake manifold. In addition, the negative pressure consumer 10 is or the negative pressure consumers 10 are each connected via check valves 17 to a negative pressure fitting 18 of the negative pressure provision unit 9. The negative pressure consumer 10 is or the negative pressure consumers 10 are thus always fluidically connected to the intake pipe 16 or the negative pressure fitting 18, depending on where a stronger negative pressure is present.

Figure 2:
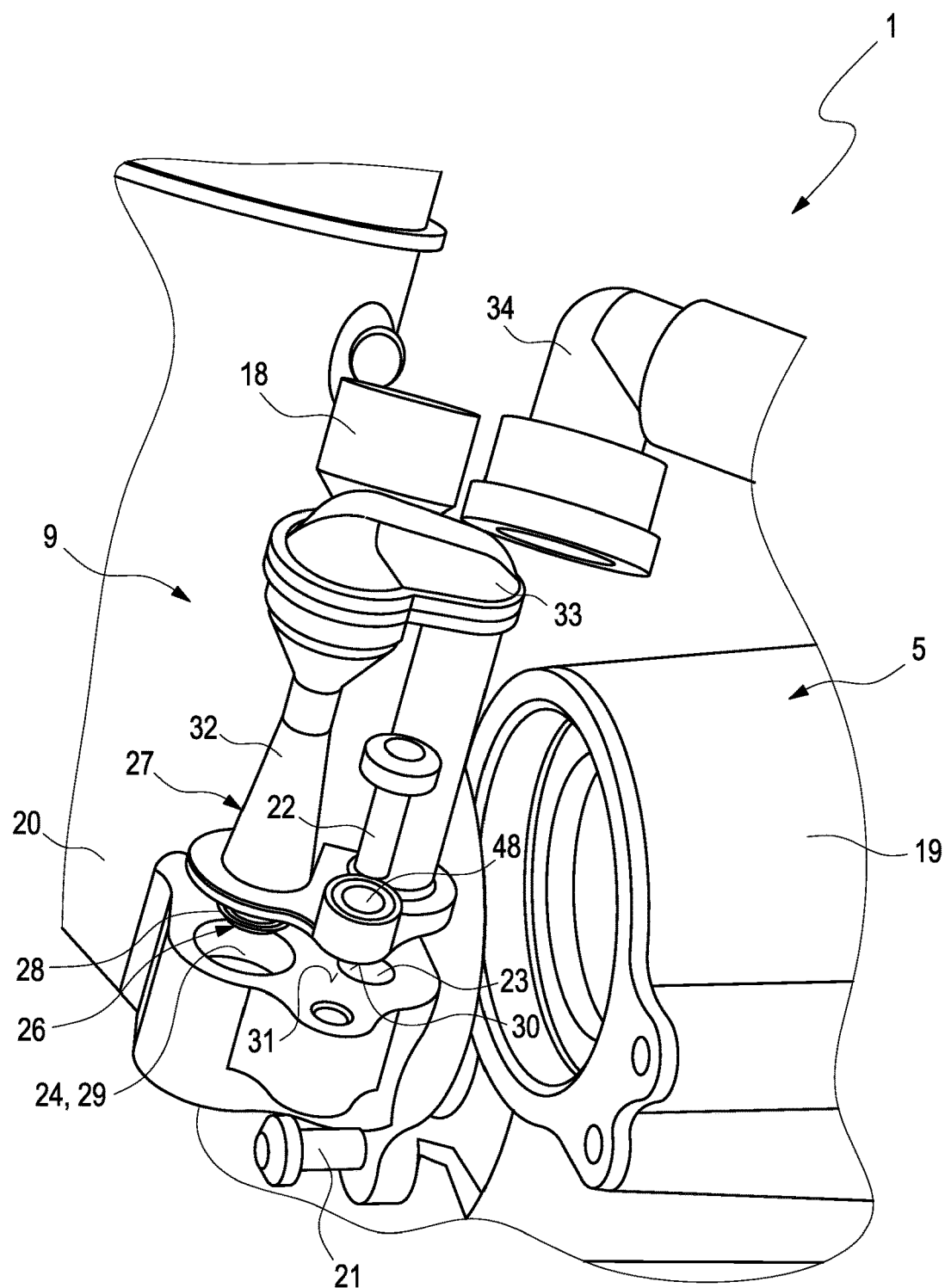
FIG. 2 shows a schematic illustration of a region of the compressor arrangement in an exploded view.

FIG. 2 shows a schematic illustration of a region of the compressor arrangement 1 in an exploded view. The compressor 5 of the exhaust gas turbocharger 3 and a compressor housing 19 of the compressor 5 can be seen. A flow guiding element 20, in which a fresh gas in the channel is provided, is fluidically connected to the compressor 5. Via the fresh gas inlet channel, the low pressure side 6 of the compressor 5 is fluidically connected to an external environment of the compressor arrangement 1, preferably via a filter or air filter. The flow guiding element 20 is fastened on the compressor housing 19, for example, by means of at least one screw 21.

The negative pressure provision unit 9 is in turn fastened on the flow guiding element 20, namely preferably again by means of a screw 22.

A first fitting 23 and a second fitting 24 are provided on the flow guiding element 20, wherein the first fitting 23 is fluidically connected via the flow guiding element 20 to the high pressure side 7 of the compressor 5 and the second fitting 20 is also fluidically connected via the flow guiding element 24 the low pressure side 6. For example, the second fitting 24 is fluidically connected inside the flow guiding element 20 to the fresh gas inlet channel.

The negative pressure provision unit 9 has a propellant inlet fitting 25 (not visible here) and a propellant outlet fitting 26. The propellant inlet fitting 25 is brought into a flow connection with the first fitting 23 and the propellant outlet fitting 26 is brought into a flow connection with the second fitting 24 when the negative pressure provision unit 9 is installed on the flow guiding element 20. Both the propellant inlet fitting 25 and also the propellant outlet fitting 26 are provided on a housing 27 of the negative pressure provision unit 9.

The propellant outlet fitting 26 is formed as a plug fitting and thus has a plug connection projection 28, which is provided and formed to be accommodated in a plug connection receptacle 29 of the second fitting 24. In contrast, the propellant inlet fitting 25 and the first fitting 23 each have a contact surface 30 or 31, respectively. The flow connection between the propellant inlet fitting 25 and the first fitting 23 is established by laying these two contact surfaces 30 and 31 flat against one another.

It is apparent that the housing 27 is in multiple pieces and consists of a base element 32 and a cover 33. The cover 33 is preferably non-detachably connected to the base element 32, but is produced separately from it. The base element 32 and the cover 33 are thus only connected to one another after they are produced. The negative pressure fitting 18, to which the at least one negative pressure consumer 10 is connectable via a negative pressure line 34, is formed on the housing 27, in the exemplary embodiment shown here on the base element 32.

Figure 3:
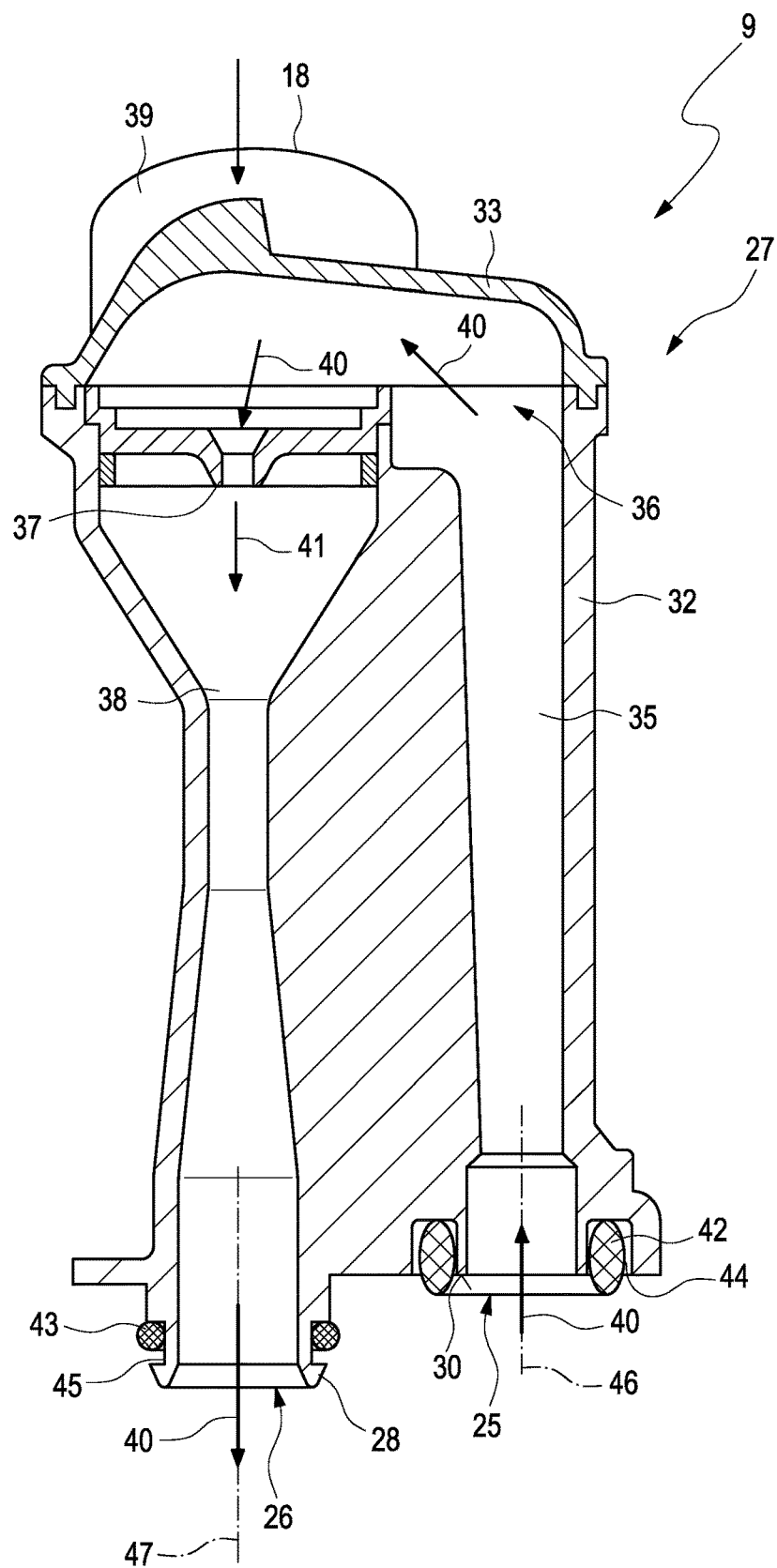
FIG. 3 shows a schematic sectional illustration through the negative pressure provision unit.

FIG. 3 shows a longitudinal sectional view of the negative pressure provision unit 9. It can be seen that a propellant channel 35 is provided in the housing 27, via which the propellant inlet fitting 25 and the propellant outlet fitting 26 are fluidically connected to one another inside the housing 27. The propellant channel 35 is largely provided in the base element 32. In some areas, however, it is delimited by the cover 33, whereby a deflection 36 is implemented.

Inside the housing 27, at least one nozzle 37 is provided in the flow path between the propellant inlet fitting 25 and the propellant outlet fitting 26, i.e., in the propellant channel 35. In the exemplary embodiment shown here, the nozzle 37 is formed as a jet nozzle, which opens into a mixing chamber 38, to which the negative pressure fitting 18 is also fluidically connected via a negative pressure channel 39. When propellant flows through the propellant channel 35 according to the arrows 40, fluid is aspirated by the negative pressure channel 39 and entrained by the propellant in the direction of the propellant outlet fitting 26, as indicated by the arrow 41. Negative pressure is provided at the negative pressure fitting 18 in this way.

It is apparent that the propellant inlet fitting 25 has an axial ring seal 42 and the propellant outlet fitting 26 has a radial ring seal 43. The axial ring seal 42 is arranged in a seal receptacle 44 and the radial ring seal 43 is arranged in a seal receptacle 45. The seal receptacles 44 and 45 are formed in the housing 27, in particular in the base element 32. It is furthermore apparent that the propellant inlet fitting 25 and the propellant outlet fitting 26 are formed offset in parallel to one another on the housing 27. For this purpose, the plug connection projection 28 extends or protrudes beyond a plane defining the propellant inlet fitting 25, namely in the axial direction with respect to a longitudinal center axis 46 of the propellant channel on the side of the propellant inlet fitting 25 or a longitudinal center axis 47 of the propellant channel 35 on the side of the propellant outlet fitting 26.

The above-mentioned screw 22, by means of which the negative pressure provision unit 9 is fastened on the flow guiding element 20, preferably has a longitudinal center axis which extends in parallel to the longitudinal center axis 46 and/or the longitudinal center axis 47. This produces a particularly good sealing effect, in particular of the axial ring seal 42. Corresponding to the alignment of the screw 22, a receptacle opening 48 for accommodating the screw 22 is also aligned having its longitudinal center axis parallel to the longitudinal center axis 46 and/or the longitudinal center axis 47.

The compressor arrangement 1 described has the advantage that, on the one hand, the negative pressure provision unit 9 is compactly constructed and moreover is replaceable. On the other hand, a high level of operational reliability is ensured in that the propellant outlet fitting 26 is formed as a plug fitting, while in contrast the flow connection between the propellant inlet fitting 25 and the first fitting 23 is established by laying the contact surfaces 30 and 31 flat against one another. Particularly simple detection of a leak is possible in this way.

The invention claimed is:

1. A method for operating a compressor arrangement for an internal combustion engine, comprising:
    a compressor, which is arranged in a compressor housing and has a low pressure side and a high pressure side, and having a flow guiding element and a negative pressure provision unit,
    a propellant channel fluidically connected, on one hand, via a propellant inlet fitting to the high pressure side of the compressor and, on another hand, via a propellant outlet fitting to the low pressure side of the compressor and a nozzle which opens into a mixing chamber in a flow path between the propellant inlet chamber and a propellant outlet chamber, and
    a negative pressure channel opening into the propellant channel fluidically between the propellant inlet fitting and the propellant outlet fitting, and which is fluidically connected to the mixing chamber,
        wherein the propellant channel is formed in a housing of the negative pressure provision unit separate from the compressor housing, on which at least one of the propellant inlet fitting and the propellant outlet fitting is formed as a plug fitting
        wherein the propellant inlet fitting is brought into fluidic connection with a first fitting and the propellant outlet fitting is brought into fluidic connection with a second fitting,
        wherein both of the first fitting and the second fitting are formed on the flow guiding element connected to the compressor housing, wherein the first fitting and the second fitting are formed offset and in parallel to one another in a vertical direction with respect to the flow guiding element and
        wherein a pressure in the negative pressure channel is measured by a pressure sensor,
    the method further comprising:
        detecting a leak if an actual pressure value falls below or exceeds a limiting pressure value.

2. A compressor arrangement for an internal combustion engine, comprising:
    a compressor which is arranged in a compressor housing and has a low pressure side and a high pressure side, and having a flow guiding element and a negative pressure provision unit,
    a propellant channel that is fluidically connected, on one hand via a propellant inlet fitting to the high pressure side of the compressor and, on another hand, via a propellant outlet fitting to the low pressure side of the compressor and has a nozzle which opens into a mixing chamber in a flow path between the propellant inlet fitting and the propellant outlet fitting, and
    a negative pressure channel opening into the propellant channel fluidically between the propellant inlet fitting and the nozzle, and which is fluidically connected to the mixing chamber,
        wherein the propellant channel is formed in a housing of the negative pressure provision unit separate from the compressor housing, on which at least one of the propellant inlet fitting and the propellant outlet fitting is formed as a plug fitting,
        wherein the propellant inlet fitting is brought into fluidic connection with a first fitting and the propellant outlet fitting is brought into fluidic connection with a second fitting,
        wherein both of the first fitting and the second fitting are formed on the flow guiding element connected to the compressor housing, and wherein the first fitting and the second fitting are formed offset and in parallel to one another in a vertical direction with respect to the flow guiding element.

3. The compressor arrangement as claimed in claim 2, wherein the propellant outlet fitting has a plug connection projection and the second fitting has a plug connection receptacle for accommodating the plug connection projection.

4. The compressor arrangement as claimed in claim 3, wherein each of the propellant inlet fitting and the first fitting has a passage opening extending through a contact surface, so that a flow connection is established between the propellant inlet fitting and the first fitting by laying the contact surfaces flat against one another.

5. The compressor arrangement as claimed in claim 3, wherein the propellant inlet fitting has an axial ring seal interacting with the first fitting and the propellant outlet fitting has a radial ring seal interacting with the second fitting.

6. The compressor arrangement as claimed in claim 3, wherein the propellant channel inside the housing has a deflection, so that both of the propellant inlet fitting and the propellant outlet fitting are arranged on a side of the housing.

7. The compressor arrangement as claimed in claim 6, wherein a deflection is formed by a cover of the housing that delimits some areas of the propellant channel.

8. The compressor arrangement as claimed in claim 2, wherein each of the propellant inlet fitting and the first fitting has a passage opening extending through a contact surface, so that a flow connection is established between the propellant inlet fitting and the first fitting by laying the contact surfaces flat against one another.

9. The compressor arrangement as claimed in claim 8, wherein the propellant channel inside the housing has a deflection, so that both of the propellant inlet fitting and the propellant outlet fitting are arranged on a side of the housing.

10. The compressor arrangement as claimed in claim 9, wherein a deflection is formed by a cover of the housing that delimits some areas of the propellant channel.

11. The compressor arrangement as claimed in claim 2, wherein the propellant inlet fitting has an axial ring seal interacting with the first fitting and the propellant outlet fitting has a radial ring seal interacting with the second fitting.

12. The compressor arrangement as claimed in claim 11, wherein the propellant channel inside the housing has a deflection, so that both of the propellant inlet fitting and the propellant outlet fitting are arranged on a side of the housing.

13. The compressor arrangement as claimed in claim 2, wherein the propellant channel inside the housing has a deflection, so that both of the propellant inlet fitting and the propellant outlet fitting are arranged on a side of the compressor housing.

14. The compressor arrangement as claimed in claim 13, wherein a deflection is formed by a cover of the negative pressure provision unit housing that delimits some areas of the propellant channel.

15. The compressor arrangement as claimed in claim 2, wherein the negative pressure provision housing is fastenable by at least one screw to the flow guiding element, and
    wherein a longitudinal center axis of a receptacle opening of the housing for accommodating the screw is arranged in parallel to a longitudinal center axis of the propellant channel at at least one of the propellant inlet fitting and a longitudinal center axis of the propellant channel at the propellant outlet fitting.

\* \* \* \* \*